(12) United States Patent
Hecker et al.

(10) Patent No.: US 7,936,128 B2
(45) Date of Patent: May 3, 2011

(54) FRIT SEAL MATERIAL, LAMP WITH FRIT SEAL, AND METHOD FOR SEALING A HIGH INTENSITY DISCHARGE LAMP

(75) Inventors: Arlene Hecker, Beverly, MA (US); Jeffrey Holt, Exeter, NH (US); Dana Caldwell, Middleton, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 268 days.

(21) Appl. No.: 12/180,729

(22) Filed: Jul. 28, 2008

(65) Prior Publication Data

US 2010/0019674 A1    Jan. 28, 2010

(51) Int. Cl.
*H01J 17/18* (2006.01)
*C03C 8/24* (2006.01)

(52) U.S. Cl. ...................... 313/624; 501/98.4

(58) Field of Classification Search .......... 313/623–625; 501/98.4, 15, 17, 19, 32, 96.1, 96.3; 220/2.1 R
See application file for complete search history.

(56) References Cited

U.S. PATENT DOCUMENTS

| | | | |
|---|---|---|---|
| 3,588,573 A | | 6/1971 | Chen et al. |
| 3,993,844 A | * | 11/1976 | Kiger et al. ............ 501/64 |
| 4,076,991 A | | 2/1978 | Datta |
| 4,501,799 A | * | 2/1985 | Driessen et al. ......... 313/625 |
| 6,012,303 A | | 1/2000 | Axelson et al. |
| 6,414,436 B1 | | 7/2002 | Eastlund et al. |
| 7,187,128 B2 | * | 3/2007 | Niimi ................ 313/623 |
| 7,362,053 B2 | * | 4/2008 | Wei et al. ............ 313/636 |
| 7,659,220 B1 | * | 2/2010 | Zheng et al. ............ 501/17 |
| 2002/0033671 A1 | | 3/2002 | Niimi |
| 2006/0008677 A1 | | 1/2006 | Bewlay et al. |
| 2006/0199041 A1 | | 9/2006 | Hecker et al. |

FOREIGN PATENT DOCUMENTS

EP       1 482 017       12/2004
WO    WO 2008/020406 A2   2/2008

OTHER PUBLICATIONS

American Ceramic Society (ACerS)—National Institute of Standards and Technology (NIST), Phase Equilibria Diagrams, Fig. 10390.
H. Yasuda et al., Solidification and shape casting of Al2O3-YAG eutectic ceramics from the undercooled melt produced by melting Al2O3-YAP eutectics, Science and Technology of Advanced Materials 5 (2004) 207-217.
U.S. Appl. No. 11/678,788, filed Feb. 26, 2007.

* cited by examiner

*Primary Examiner* — Peter Macchiarolo
(74) *Attorney, Agent, or Firm* — Robert F. Clark

(57) ABSTRACT

A high intensity discharge lamp includes an arc tube with a chemical fill, capillaries extended from the arc tube, electrodes fed through the capillaries into the arc tube, and a frit seal that seals the capillaries, where the frit seal includes silica ($SiO_2$) in a range of more than 0 wt % to less than 5 wt %, alumina ($Al_2O_3$), and one of dysprosia ($Dy_2O_3$) and yttrium oxide ($Y_2O_3$). This frit seal material can withstand a higher operating temperature so that the length of the capillaries can be reduced compared to those sealed with conventional frit seal material.

13 Claims, 4 Drawing Sheets

FRIT SEAL MATERIAL, LAMP WITH FRIT SEAL, AND METHOD FOR SEALING A HIGH INTENSITY DISCHARGE LAMP

BACKGROUND OF THE INVENTION

The present invention is directed to a material for sealing a ceramic body, a lamp using this material as a frit seal, and a method for sealing a ceramic body, such as a high intensity discharge lamp, with this material.

FIG. 1 shows a discharge vessel 1 for a conventional ceramic metal halide, high intensity discharge lamp. The discharge vessel 1 includes a ceramic arc tube 6 filled with a chemical fill 8 and into which electrodes 14 are fed through ceramic capillaries 2. The arc tube has halves 17a,b that are joined at seam 5, where the electrode ends 3 are inside the respective halves. The distal ends of the capillaries are each sealed with a respective frit seal 9. The capillaries 2 are long relative to the size of the arc tube 6 (e.g., each capillary is longer than the diameter of the arc tube) in order to reduce the temperature of the frit seal 9. Long capillaries are required because the conventional material of the frit seal 9 is reactive with the chemical fill (e.g., a mercury and a mixture of metal halides) in the arc tube at elevated temperatures. If the frit seal is too close to the chemical fill, the heat-induced reaction of the frit seal material with the chemical fill can cause a color shift and reduce lamp life.

As described in U.S. Pat. No. 4,076,991, a material conventionally used to seal an inlead to a ceramic body is made from dysprosia ($Dy_2O_3$), alumina ($Al_2O_3$), and silica ($SiO_2$). The weight percentages (wt %) of the material (without the binder) may vary in the ranges of 20-80 wt % dysprosia, 0-55 wt % alumina, and 5-45 wt % silica. The Patent indicates that outside these composition limits, the seals "can be made only with difficulty and with large mechanical tension in the sealing joints upon cooling." In practice, the material of a typical frit seal is approximately 55 wt % dysprosia, 20 wt % alumina, and 25 wt % silica, which are well inside these composition limits.

International Patent Publication WO 2008/020406 describes a method for making the frit seal in which the material of the frit seal is pressed and sintered into the form a ring that is mounted on the extended electrodes and melted to seal the ceramic discharge vessel. This Publication further describes a material for the frit seal that includes 25-60 wt % cerium oxide ($Ce_2O_3$), 12-64 wt % alumina, and 3-50 wt % silica, and more preferably 30-57 wt % cerium oxide, 20-48 wt % alumina, and 10-22 wt % silica. Using cerium oxide lowers the frit melting point, thereby facilitating manufacture of the discharge vessel.

SUMMARY OF THE INVENTION

An object of the present invention is to reduce the length of capillaries in a high intensity discharge lamp.

A further object of the present invention is to provide a novel frit seal material with improved reaction to heat so that the length of the capillaries can be reduced.

A still further object of the present invention is to provide a novel material for sealing a ceramic body, where the material includes silica ($SiO_2$) in a range of more than 0 wt % to less than 5 wt %, alumina ($Al_2O_3$), and one of dysprosia ($Dy_2O_3$) and yttrium oxide ($Y_2O_3$).

A yet further object of the present invention is to provide a novel frit seal material, a novel lamp with a frit seal of this material, and novel method of making a frit seal for a high intensity discharge lamp, where the frit seal material includes silica ($SiO_2$) in a range of more than 0 wt % to less than 5 wt %, alumina ($Al_2O_3$), and one of dysprosia ($Dy_2O_3$) and yttrium oxide ($Y_2O_3$).

These and other objects and advantages of the invention will be apparent to those of skill in the art of the present invention after consideration of the following drawings and description of preferred embodiments.

DETAILED DESCRIPTION OF THE INVENTION

The material of the present invention that is used to seal a ceramic body has been shown to be able to withstand higher operating temperatures than the material of conventional frit seals. The ability to withstand a higher operating temperature means that a frit seal with the material of the present invention can be closer to the discharge chamber, which means that the capillaries can be shorter. Arc tubes with shorter capillaries have lower cost, are easier to manufacture, and are more compact, thereby offering greater flexibility in lamp package design.

Figure 1:
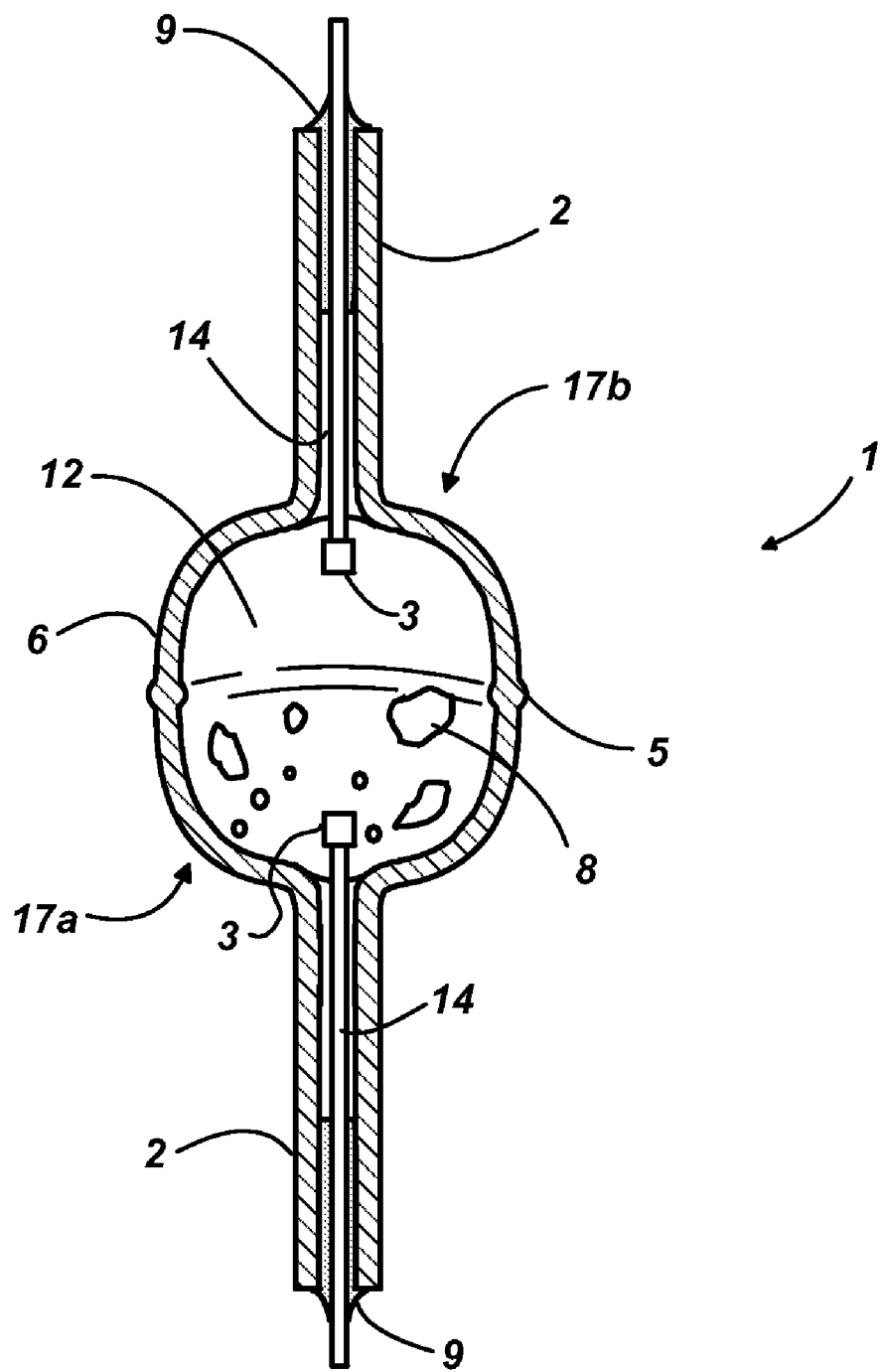
FIG. 1 is a cross section of a conventional ceramic metal halide, high intensity discharge lamp.
Figure 2:
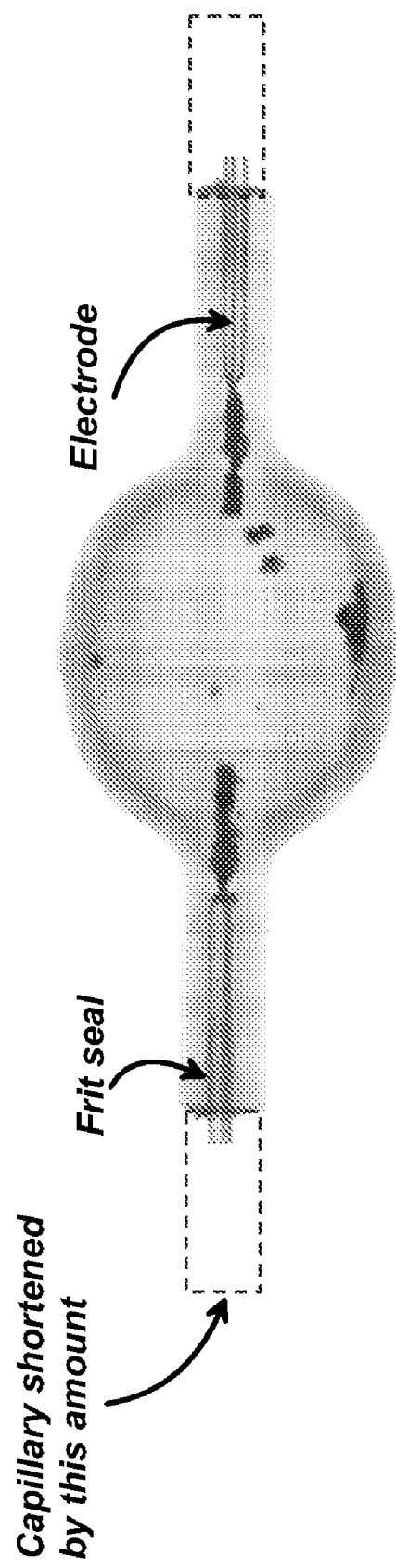
FIG. 2 is an X-ray image of an embodiment of an arc tube incorporating the frit seal material of the present invention, showing the shorter capillaries.

FIG. 2 is an X-ray image of an embodiment of a lamp that includes the frit seal material of the present invention. As shown by the dashed portions at the distal ends of the ceramic capillaries, the capillaries are about 40% shorter than capillaries in conventional lamps and the lamp itself is about 30% shorter. As a result, the frit seals of the lamp of the present invention are exposed to temperatures that are over 100° C. hotter than a conventional lamp. Tests have shown that shorter-capillary lamps with the frit seal material of the present invention last longer than those lamps with conventional frit seal material despite the higher operating temperature of the seals. The seal of the frit seal material of the present invention remained hermetic after 4000 hours of testing, while a conventional frit seal material failed after 100-600 hours when exposed to the higher operating temperature.

Figure 3:
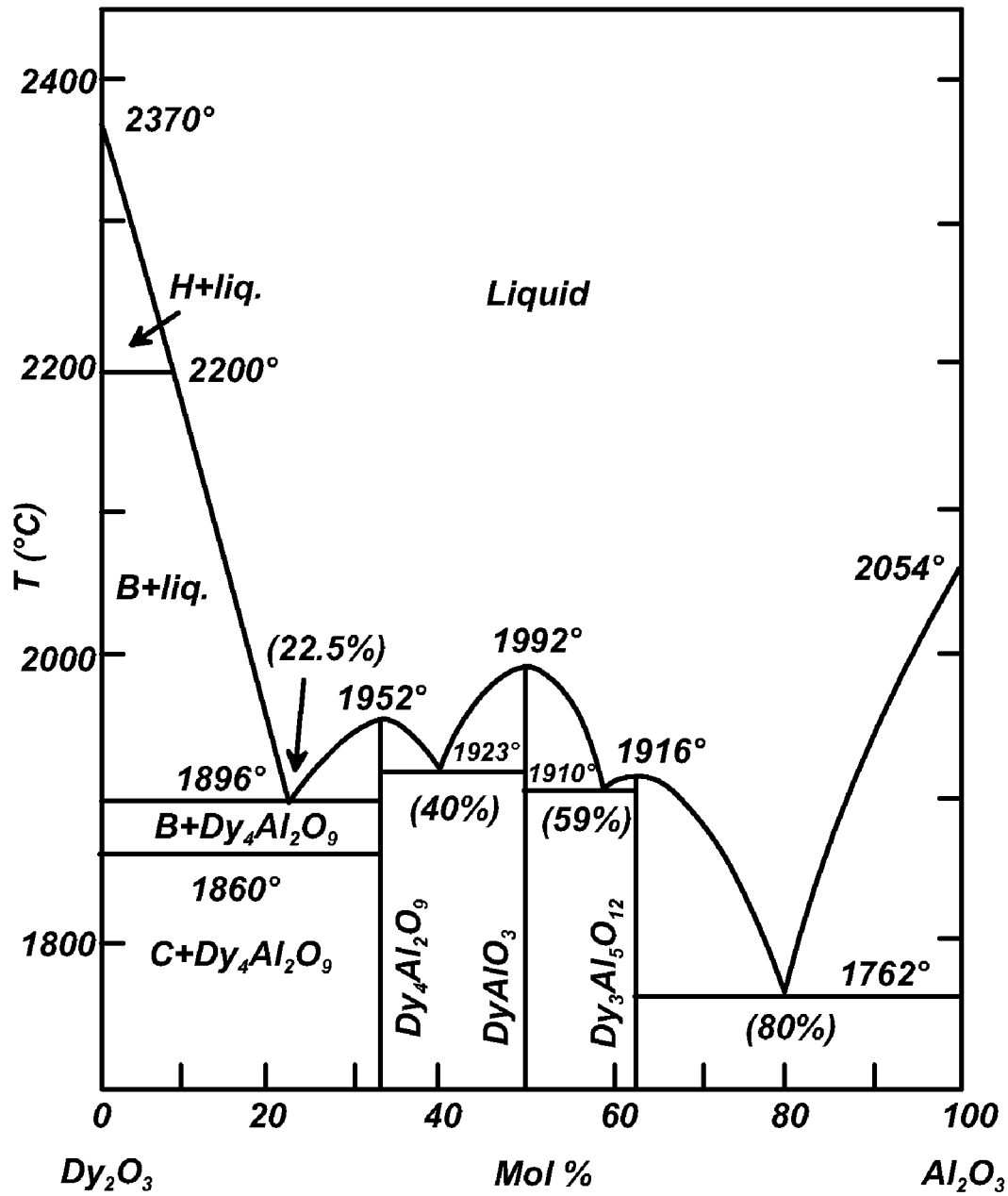
FIG. 3 is a phase diagram for $Al_2O_3/Dy_2O_3$ showing the low-melting eutectic (Tm=1762° C.).
Figure 4:
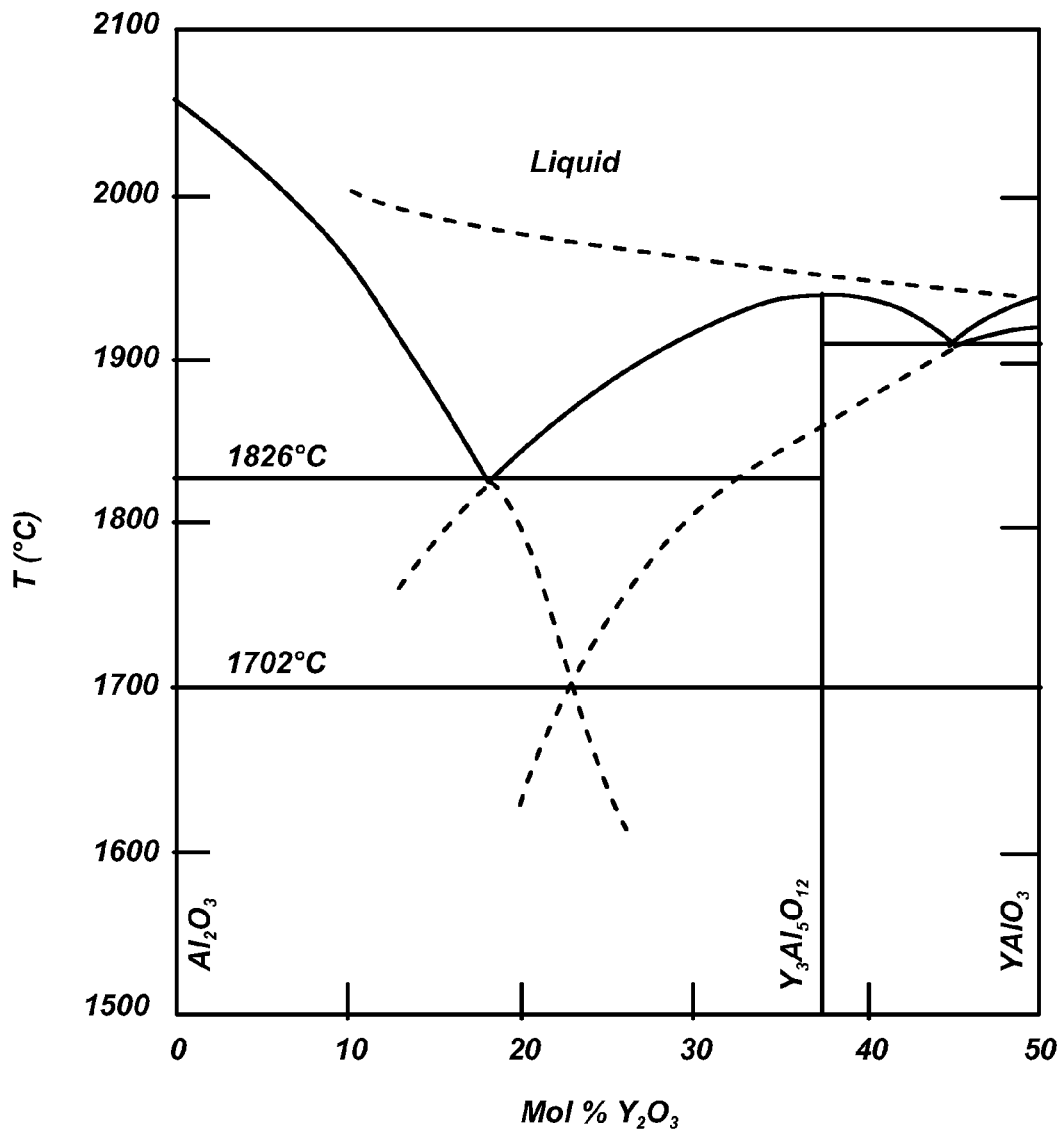
FIG. 4 is a phase diagram for $Al_2O_3/Y_2O_3$ showing the low-melting eutectic (Tm=1826° C.).

The frit seal material of the present invention includes silica ($SiO_2$) in a range of more than 0 wt % to less than 5 wt %, alumina ($Al_2O_3$), and one of dysprosia ($Dy_2O_3$) and yttrium oxide ($Y_2O_3$). The composition is preferably such that the relative proportions of alumina and dysprosia (or yttrium oxide) in the mixture are close to the composition of the lowest-melting-temperature eutectic for the $Al_2O_3/Dy_2O_3$ (or $Al_2O_3/Y_2O_3$) systems (1762° C. for $Al_2O_3/Dy_2O_3$ and 1826° C. for $Al_2O_3/Y_2O_3$). Phase diagrams for the $Al_2O_3/Dy_2O_3$ and $Al_2O_3/Y_2O_3$ systems are shown in FIGS. 3 and 4, respectively. The small amount of silica reduces the melting temperature slightly and improves the sealing process significantly. A frit seal with this composition can withstand higher temperatures and is more chemically resistant than conventional frit materials with approximately 55 wt % dysprosia, 20 wt % alumina, and 25 wt % silica.

Tests have shown that satisfactory results are achieved with 2.9 and 4.8 wt % silica, but results were not satisfactory at about 7 wt % silica. With 2.9 wt % silica, the other components may be 50.7 wt % alumina and 46.4 wt % dysprosia;

with 4.8 wt % silica, the other components may be 49.7 wt % alumina and 45.5 wt % dysprosia. Alternatively, with 2.9 wt % silica, the other components may be 64.6 wt % alumina and 32.5 wt % yttrium oxide; and with 4.8 wt % silica, the other components may be 63.6 wt % alumina and 31.6 wt % yttrium oxide. These percentages are without a binder.

The material of the present invention may be prepared by mixing the oxide powders of the proper composition with about 3-6 wt % polyvinyl alcohol binder dissolved in deionized (DI) water (e.g., with a Thinky™ AR-500 orbital mixer). The mixture may be dried overnight at about 50° C., crushed and sieved. The resulting powder may be pressed into small rings of suitable size and weight (as explained, for example, in the above-noted International Patent Publication WO 2008/020406), and then sintered in air at 1375° C. for one hour to remove the binder, to further combine the oxides, and to give the rings strength for handling. The sintered rings may be mounted on electrodes at ends of the capillaries and melted to seal the capillaries.

The composition can also be applied in paint-like slurry, as a vapor-deposited coating, or with another suitable technique.

The material can also be used to hermetically join ceramics (e.g., sapphire, YAG, etc.) and metals (e.g., niobium, molybdenum, MoV, tungsten, etc.) Thus, arc tubes or other embodiments that are exposed to high temperatures and/or corrosive environments can be formed in a wider range of sizes, complexity, and functionality.

While embodiments of the present invention have been described in the foregoing specification and drawings, it is to be understood that the present invention is defined by the following claims when read in light of the specification and drawings.

We claim:

1. A material for sealing a ceramic body, the material consisting essentially of silica ($SiO_2$) in a range of more than 0 wt % to less than 5 wt %, alumina ($Al_2O_3$), and one of dysprosia ($Dy_2O_3$) or yttrium oxide ($Y_2O_3$), wherein the material has a composition close to either a $Al_2O_3/Dy_2O_3$ eutectic composition having a melting point of 1762° C. or a $Al_2O_3/Y_2O_3$ eutectic composition having a melting point of 1826° C.

2. The material of claim 1, with 2.9 wt % silica, 50.7 wt % alumina, and 46.4 wt % dysprosia.

3. The material of claim 1, with 4.8 wt % silica, 49.7 wt % alumina, and 45.5 wt % dysprosia.

4. The material of claim 1, with 2.9 wt % silica, 64.6 wt % alumina, and 32.5 wt % yttrium oxide.

5. The material of claim 1, with 4.8 wt % silica, 63.6 wt % alumina, and 31.6 wt % yttrium oxide.

6. A high intensity discharge lamp comprising:
an arc tube with a chemical fill;
capillaries extended from the arc tube;
electrodes fed through the capillaries into the arc tube; and
a frit seal that seals the capillaries, the frit seal consisting essentially of silica ($SiO_2$) in a range of more than 0 wt % to less than 5 wt %, alumina ($Al_2O_3$), and one of dysprosia ($Dy_2O_3$) or yttrium oxide ($Y_2O_3$), wherein the frit seal has a composition close to either a $Al_2O_3/Dy_2O_3$ eutectic composition having a melting point of 1762° C. or a $Al_2O_3/Y_2O_3$ eutectic composition having a melting point of 1826° C.

7. The lamp of claim 6, wherein the capillaries have a length that is less than a diameter of the arc tube.

8. The lamp of claim 6, wherein the frit seal has 2.9 wt % silica, 50.7 wt % alumina, and 46.4 wt % dysprosia.

9. The lamp of claim 6, wherein the frit seal has 4.8 wt % silica, 49.7 wt % alumina, and 45.5 wt % dysprosia.

10. The lamp of claim 6, wherein the frit seal has 2.9 wt % silica, 64.6 wt % alumina, and 32.5 wt % yttrium oxide.

11. The lamp of claim 6, wherein the frit seal has 4.8 wt % silica, 63.6 wt % alumina, and 31.6 wt % yttrium oxide.

12. A method making a frit seal for a high intensity discharge lamp, comprising the steps of:
mixing silica ($SiO_2$) in a range of more than 0 wt % to less than 5 wt %, alumina ($Al_2O_3$), and one of dysprosia ($Dy_2O_3$) or yttrium oxide ($Y_2O_3$) to form a mixture, wherein the mixture has a composition close to either a $Al_2O_3/Dy_2O_3$ eutectic composition having a melting point of 1762° C. or a $Al_2O_3/Y_2O_3$ eutectic composition having a melting point of 1826° C.,
adding a binder to the mixture;
pressing the mixture and binder into rings; and
sintering the rings to remove the binder.

13. The method of claim 12, further comprising the steps of mounting the sintered rings on electrodes at ends of capillaries that are attached to an arc tube with a chemical fill, and melting the sintered rings to seal the capillaries.

* * * * *